(12) United States Patent
McKenney

(10) Patent No.: US 7,587,615 B2
(45) Date of Patent: Sep. 8, 2009

(54) UTILIZING HARDWARE TRANSACTIONAL APPROACH TO EXECUTE CODE AFTER INITIALLY UTILIZING SOFTWARE LOCKING BY EMPLOYING PSEUDO-TRANSACTIONS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 10/661,017

(22) Filed: Sep. 12, 2003

(65) Prior Publication Data

US 2005/0060559 A1    Mar. 17, 2005

(51) Int. Cl.
  *G06F 11/30*  (2006.01)
  *G06F 12/14*  (2006.01)
(52) U.S. Cl. ...................... 713/190; 713/194
(58) Field of Classification Search .................. 713/194
  See application file for complete search history.

(56) References Cited

U.S. PATENT DOCUMENTS

| 6,219,690 | B1 * | 4/2001 | Slingwine et al. | 718/102 |
| 6,816,952 | B1 * | 11/2004 | Vartti et al. | 711/163 |
| 6,941,473 | B2 * | 9/2005 | Etoh et al. | 726/5 |
| 6,993,663 | B1 * | 1/2006 | Paya et al. | 711/163 |
| 2001/0013094 | A1 * | 8/2001 | Etoh et al. | 712/227 |
| 2004/0133777 | A1 * | 7/2004 | Kiriansky et al. | 713/166 |

* cited by examiner

*Primary Examiner*—Nasser Moazzami
*Assistant Examiner*—Chinwendu C Okoronkwo
(74) *Attorney, Agent, or Firm*—Steven Lieske Bennett

(57) ABSTRACT

Utilizing a hardware transactional approach to execute a code section by employing pseudo-transactions, after initially utilizing software locking, is disclosed. A method is disclosed that utilizes a software approach to locking memory to execute a code section relating to memory. The software approach employs a pseudo-transaction to determine whether a hardware approach to transactional memory to execute the threshold would have been successful. Where the hardware approach to transactional memory to execute the code section satisfies a threshold based on success of at least the pseudo-transaction, the method subsequently utilizes the hardware approach to execute the code section. The hardware approach may include starting a transaction inclusive of the code section, conditionally executing the transaction, and, upon successfully completing the transaction, committing execution of the transaction to the memory to which the code section relates.

19 Claims, 3 Drawing Sheets

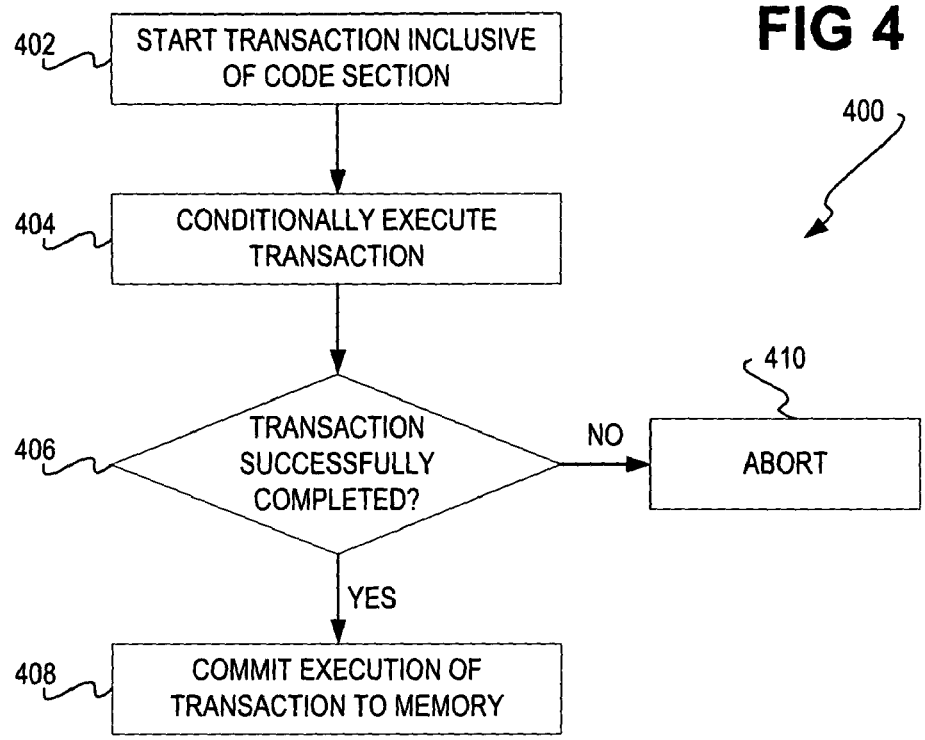
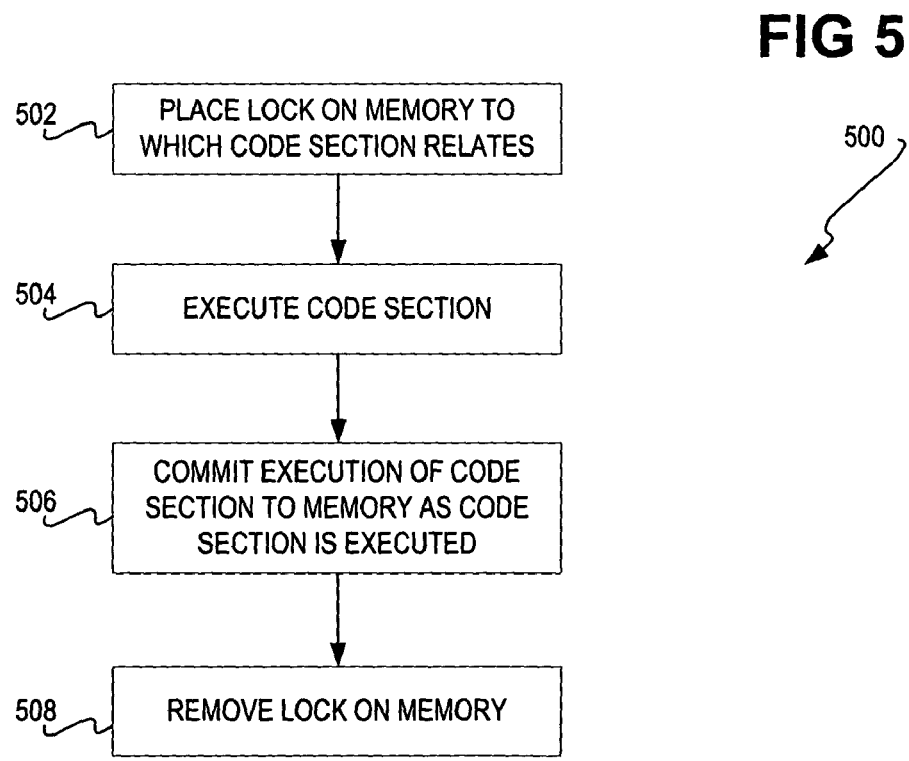

UTILIZING HARDWARE TRANSACTIONAL APPROACH TO EXECUTE CODE AFTER INITIALLY UTILIZING SOFTWARE LOCKING BY EMPLOYING PSEUDO-TRANSACTIONS

BACKGROUND OF THE INVENTION

1. Technical Field

This invention relates generally to executing a section of code on an all-or-nothing basis, such that the entire section of code is executed and committed to memory, or none of the section of code is executed and committed to memory. The invention relates more particularly to software locking approaches and hardware transactional approaches to such execution of code on an all-or-nothing basis.

2. Description of the Prior Art

In multiple-processor computing systems, more than one processor may attempt to affect the same memory at the same time. For instance, a number of transactions, which may be read or write requests or responses to resources such as memory, may vie for the same memory at the same time. If each transaction is allowed unfettered access to the same memory, the results can include corrupting the integrity of the data stored in this memory. For example, one transaction may read a given memory line, act upon the value read, and then write a new value to the memory line. While the transaction is acting upon the value it read from the memory line, another transaction may write a different value to the memory line. When the first transaction writes its new value to the memory line, the second transaction may not realize that its value has been overwritten.

One approach to ensuring that a number of transactions are not attempting to process the same memory at the same time is to use a software locking approach. In a software locking approach, a transaction must first successfully obtain a lock on the relevant lines of memory before it is able to process the data stored in these memory lines. If two transactions are attempting to process the same memory line, then one transaction will initially win the lock, and be able to process the memory line before the second transaction does. Thus, the transactions are implicitly serialized, so that they do not try to compete for the same memory line at the same time. A disadvantage to using the software locking approach is that it can add overhead to the processing of transactions that in most cases is unnecessary, since most of the time there will be no contention for desired memory lines. This can cause degradation in performance of the entire system.

Another approach to ensuring that a number of transactions are not attempting to process the same memory at the same time is to use a hardware transactional memory approach. In a hardware transactional memory approach, the hardware of a system, specifically its processors, have the ability to process sections of code as transactional memory. Transactional memory can thus be considered as a way to bracket a code section such that it becomes a large, multi-argument load link/store conditional (LL/SC) transaction. The code section is executed speculatively, and the decision to commit the changes is deferred until the end of the section of code. If there has been any interference with any of the data used by the code section, such as the memory lines, cache lines, and so on, being used by the code section, then the entire transaction is aborted. Otherwise, the entire transaction is committed to memory, and the changes memory to the relevant memory and caches lines are effected.

While the hardware transactional memory approach is faster in performance than the software locking approach, it nevertheless suffers from some disadvantages. For the hardware transactional memory approach to work, the operations performed by the relevant section of code are accomplished within a cache before being committed to memory. However, if the cache is not large enough, or does not have great enough associativity, then the approach will fail. This is because the entire section of code will not be able to be completely executed speculatively before the processing effects of the code section are committed to memory. That is, the hardware transactional memory approach, while advantageous in performance as compared to the software locking approach, is not as widespread in its potential application as is the software locking approach. For these and other reasons, therefore, there is a need for the present invention.

SUMMARY OF THE INVENTION

The invention relates to utilizing a hardware transactional approach to execute code, after initially utilizing software locking, by employing pseudo-transactions. A method of the invention includes utilizing a software approach to locking memory to execute a code section relating to memory, and employing a pseudo-transaction to determine whether a hardware approach to execute the threshold would have been successful. Where the hardware approach satisfies a threshold based on success of at least the pseudo-transaction, the hardware approach is subsequently utilized to execute the code section.

A system of the invention includes a processor having transactional memory capability, and memory. The transactional memory capability of the processor includes a pseudo-transactional memory capability that determines whether the transactional memory capability would have been successful. The memory stores a spin lock function to execute a code section by utilizing the transactional memory capability upon the transactional memory capability having satisfied a threshold based upon success of at least the pseudo-transactional memory capability.

An article of manufacture includes a computer-readable medium and means in the medium. The means in the medium is for utilizing a hardware approach to transactional memory to execute a code section after having utilized a software approach to locking memory to execute the code section and the hardware approach having satisfied a threshold based at least upon a pseudo-transaction to determine whether the hardware approach would have succeeded in executing the code section. Other features and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a flowchart of a method for executing a section of code according to a hardware approach to transactional memory, according to an embodiment of the invention.

FIG. 5 is a flowchart of a method for executing a section of code according to a software approach to locking memory, according to an embodiment of the invention.

DESCRIPTION OF THE PREFERRED EMBODIMENT

Overview and Method

Figure 1:
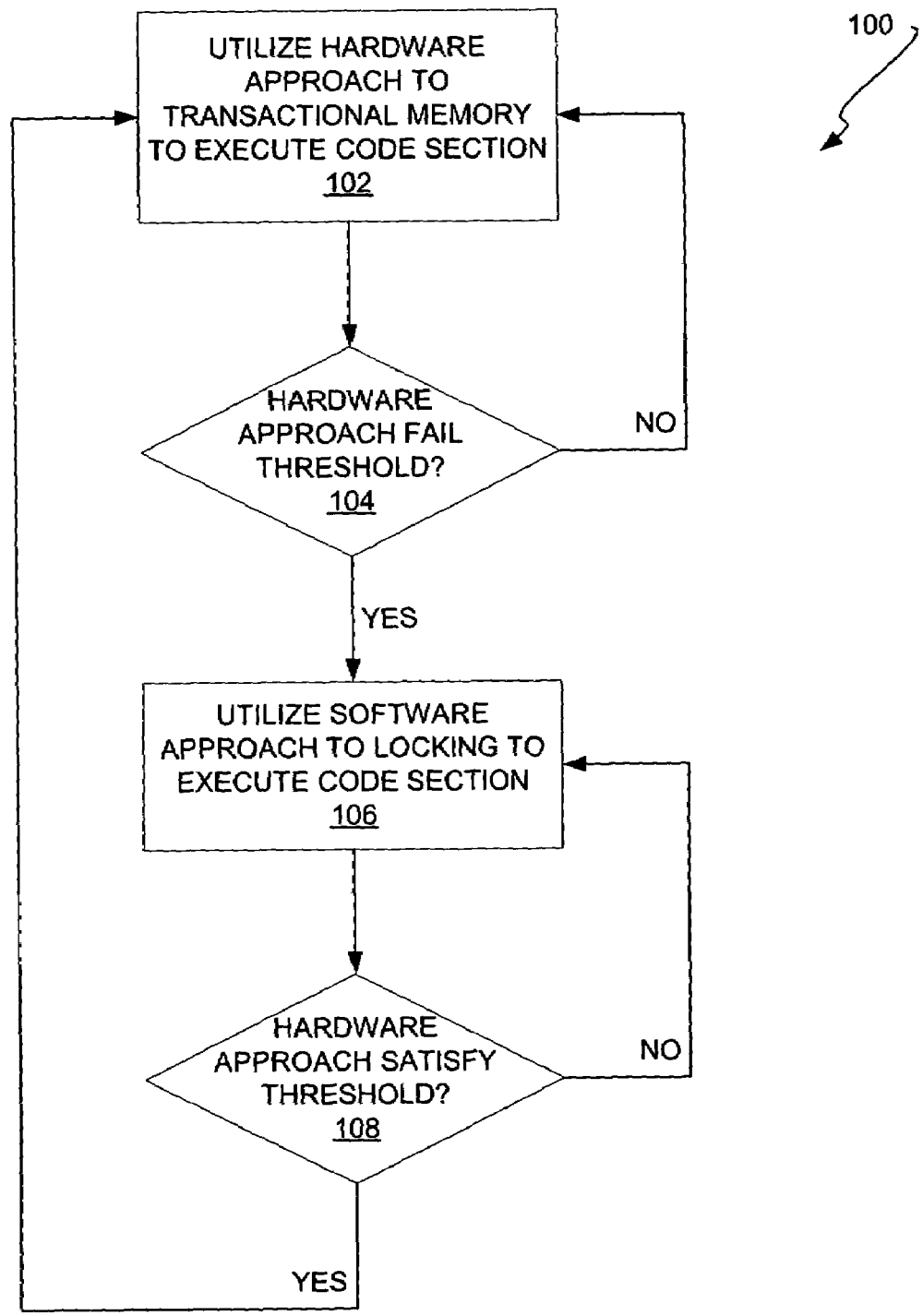
FIG. 1 is a flowchart of a method according to a preferred embodiment of the invention, and is suggested for printing on the first page of the patent.

FIG. 1 shows a method 100, according to a preferred embodiment of the invention. Like other methods of embodiments of the invention, the method 100 may be implemented as a computer-readable medium on an article of manufacture. The medium may be a recordable data storage medium, such as a magnetic, semiconductor, and/or optical medium, a removable or a fixed medium, and/or a volatile or a non-volatile medium. The medium may also be a modulated carrier signal. The method 100 may be performed by a processor of a node of a multi-node system that is to execute a section of code that relates to memory of the node.

A hardware approach to transactional memory is initially used to execute a section of code on an all-or-nothing basis (102). That is, the hardware approach to transactional memory is utilized such that either the entire section of code is executed and committed to memory, or none of the section of code is executed and committed to memory. The hardware approach to transactional memory thus treats the section of code as a single transaction. It conditionally executes the code section, committing execution of the code section to memory only if the entire code section can be completed. The hardware approach to transactional memory is a hardware approach in that it is accomplished in hardware, such as by the transactional memory capability of the processor that is performing the method 100.

If the hardware approach does not fail a threshold in executing the code section (104), then the next time the code section needs to be executed, the hardware approach to transactional memory is again employed to execute the section of code (102). In one embodiment, the hardware approach fails the threshold if it is forced to abort execution of the code section a single time. That is, the hardware approach fails the threshold if it fails to completely execute the code section a single time. In another embodiment, the hardware approach fails the threshold if it is forced to abort execution of the code section a predetermined number of times. Abortion of code section execution may be caused when another code section is attempting to read from and/or write to the same memory that the first code section is processing, for instance. Other approaches to determine whether the hardware approach has failed the threshold are described in a later section of the detailed description.

If the hardware approach fails the threshold in executing the code section (104), then a software approach to locking memory is instead utilized to execute the section of code (106). The software approach is utilized by first locking the memory to which the code section relates. The code section is then executed, and is committed to memory as it is executed. No other sections of code can read from and/or write to the same memory to which the code section relates, because the code section has placed a lock on the memory. When the code section has finished being executed, the lock on the memory that it was accessing is released, or removed. The software approach to locking memory may be implemented by a spin-lock function that is called prior to executing the section of code, and a spin-unlock function that is called after executing the section of code, as is described in more detail in a later section of the detailed description.

Preferably, after the software approach has been utilized to execute the section of code, if the hardware approach to transactional memory has again satisfied the threshold (108), then the hardware approach is utilized the next time the code section needs to be executed (102). As will be described in more detail in a later section of the detailed description, this can be implemented in one embodiment by having a pseudo-transaction executed, or performed, concurrently with the software approach in 106. A pseudo-transaction is similar to an actual hardware transaction employed by the hardware approach to transactional memory, but unconditionally performs the instructions in the code section, and unconditionally commits execution of the code section to memory. A pseudo-transaction never aborts, but rather determines whether an actual transaction would have been successful in execution. That is, a pseudo-transaction is employed to determine whether utilizing the hardware approach to transactional memory would have been successful in executing the code section. Thus, a pseudo-transaction can be employed to determine whether the hardware approach to transactional memory has again satisfied the threshold in 108. Furthermore, determining whether the hardware approach to transactional memory has satisfied the threshold can be based upon the success of previous pseudo-transactions and/or previous transactions.

However, if the hardware approach has not satisfied the threshold (108), then the software approach is utilized the next time the code section needs to be executed (106). In this way, the software approach is a fallback approach to executing the section of code, where the hardware approach is the default and preferred approach to executing the section of code. This may be because the hardware approach provides for improved system performance as compared to utilizing the software approach, for instance.

System and Code Section Execution

Figure 2:
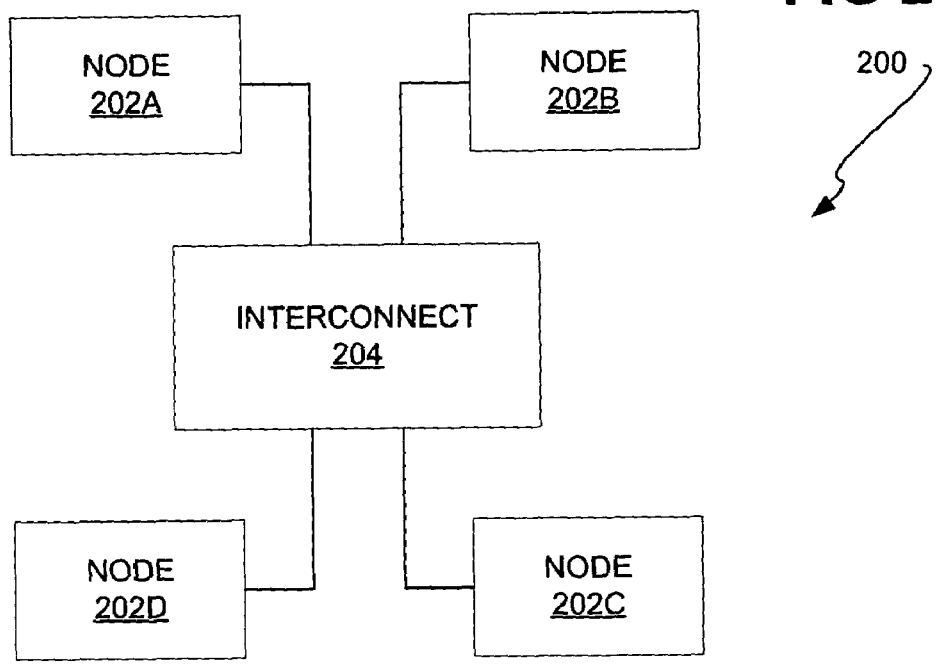
FIG. 2 is a diagram of a system having a number of nodes, in conjunction with which embodiments of the invention may be implemented.

FIG. 2 shows a system 200 in accordance with which embodiments of the invention may be implemented. The system 200 includes a number of nodes 202A, 202B, 202C, and 202D, which are collectively referred to as the nodes 202. The nodes 202 are connected with one another through an interconnection network, or interconnect, 204. Each of the nodes 202 may include at least one processor and memory. Where the system 200 is a non-uniform memory architecture (NUMA) system, the memory of a given node is local to the processors of the node, and is remote to the processors of the other nodes. However, the system 200 may be another type of system in lieu of being a NUMA system.

Figure 3:
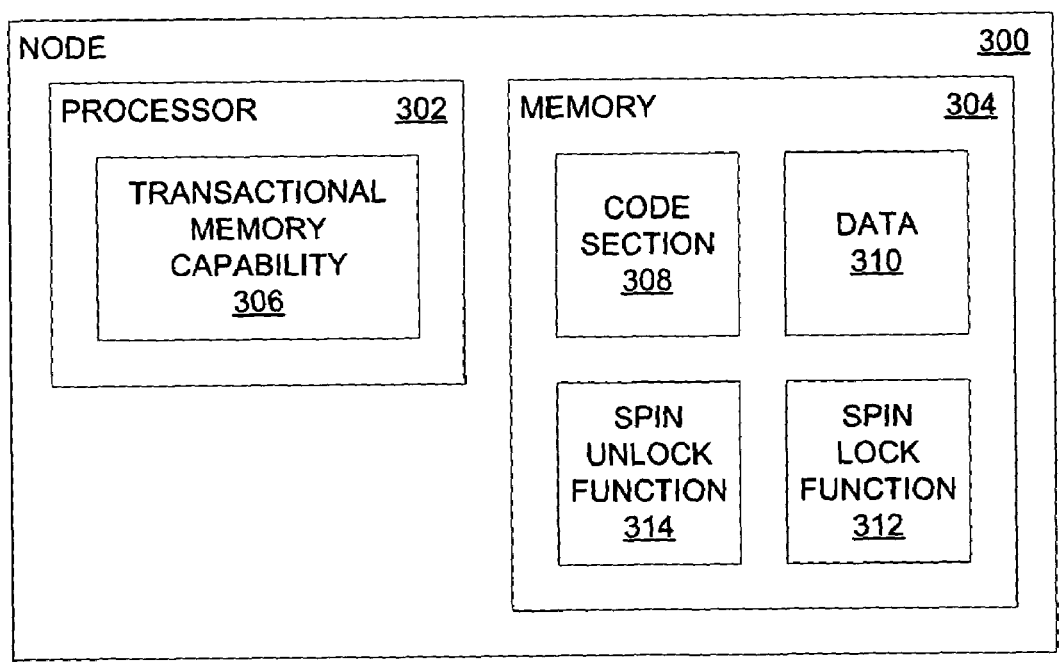
FIG. 3 is a diagram of one of the nodes of the system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. The node 300 includes a processor 302 and a memory 304. There may be other processors within the node 300 besides the processor 302. The memory 304 may be or include random-access memory (RAM), as well as other types of memory, such as non-volatile memory, read-only memory (ROM), and so on.

The processor 302 includes transactional memory capability 306, which is used to effect the hardware transactional approach to executing code sections, as has been described.

Alternatively, the transactional memory capability 306 may be a part of hardware other than the processor 302. The transactional memory capability 306 may in one embodiment include pseudo-transactional memory capability as well, such that it can be determined whether the hardware transactional approach to executing code sections would have been successful, even where the hardware transactional approach is nevertheless not currently employed for code section execution.

The memory 308 includes a code section 308, data 310, a spin lock function 312, and a spin unlock function 314. The code section 308 is a section of code that is preferably executed on an all-or-nothing basis. That is, either the entirety of the code section 308 is executed and committed to memory, or none of the code section 308 is executed and committed to memory. The data 310 is the part of the memory 304 to which the code section 308 relates. That is, the data 310 is the data that is processed by the code section 308.

The spin lock function 312 and the spin unlock function 314 effect the software approach to locking and unlocking memory that has been described. Particularly, the spin lock function 312 is called to lock the memory, such as the data 310, for the code section 308 to be executed without interruption or corruption of the data 310. The spin unlock function 314 is then called to unlock the memory after the code section 308 has been executed. That is, the unlock function 314 is called to remove, or release, the lock on the data 310 after the code section 308 has been executed. As is described in more detail in a later section of the detailed description, the spin lock and unlock functions 312 and 314 may default to utilization of the transactional memory capability 306 of the processor 302 to execute the code section 308, and utilize their software locking capability as a fallback approach for executing the code section 308.

FIG. 4 shows a method 400 for using a hardware approach to transactional memory to execute a section of code, according to an embodiment of the invention. For instance, the method 400 may be that which is performed by the transactional memory capability 306 to execute the code section 308. First, a transaction inclusive of the relevant section of code is started (402). The transaction is conditionally executed (404). For instance, results of the conditional execution of the transaction may be temporarily stored in a processor cache or other type of cache. If the transaction has successfully completed (406), then execution of the transaction is committed to memory (408), such that the entire section of code has been executed. Otherwise, the transaction is aborted (410), and none of the section of code is effectively executed in actuality.

FIG. 5 shows a method 500 for using a software approach to locking memory to execute a section of code, according to an embodiment of the invention. For instance, the method 500 may be that which is performed by the spin lock and unlock functions 312 and 314 to execute the code section 308. First, a lock is placed on the memory to which a relevant section of code relates (502). This is the memory that is to be processed by the section of code, such as the data 310 of the memory 304. The lock prevents other sections of code, for instance, from processing the memory while the relevant section of code is processing the memory. The code section is then executed (504), such that execution of the code section is committed to memory as it is executed (506). That is, the code section is not executed on a conditional basis. Since the memory to which the code section relates is locked, the code section may be committed to memory as it is executed. Finally, the lock on the memory to which the code section relates is removed, or released (508), so that other code sections, for instance, may process the memory.

Particular Embodiment and Pseudo-Code

A particular embodiment of the spin lock function 312 and the spin unlock function 314 is now described, in relation to pseudo-code that implements both of these functions. The functions 312 and 314 are specifically described as implementing both the software approach to locking memory and the hardware approach to transactional memory that have been described. The spin lock function 312 is called to lock the relevant memory for a section of code to be executed, be it by the hardware or the software approach. The spin unlock function 314 is then called to release the lock from the memory after the section of code has been executed.

First, a number of memory-transaction primitives are described that are utilized in the pseudo-code. The primitives include begin_txn( ), begin_txn_check( ), commit_txn( ), and abort_txn( ). The primitive begin_txn( ) may be of type integer, and marks the start of a hardware transaction. It returns true. If a given transaction is then aborted by the hardware, execution resumes after the corresponding begin_txn( ), which returns false. This can be implemented in one embodiment with an instruction that takes a branch address for the abort path, so long as that instruction restores registers in the event of an abort. In another embodiment, software can save and restore the registers, but this approach may impose undesired added overhead on the system.

The primitive begin_txn_check( ) marks the start of a pseudo-transaction. A pseudo-transaction does not affect instruction execution, except to track whether a real transaction would have been successful. The pseudo-code uses this primitive to determine when it is acceptable to switch back from a software locking approach to a hardware transactional approach. Although not included in the pseudo-code, an additional primitive of type int, end_txn_check( ), may be provided to mark the end of a pseudo-transaction, returning true if a real transaction would have succeeded. However, this primitive is not needed, as described in the next paragraph, and thus is not included in the pseudo-code.

The primitive commit_txn( ) may be of type integer, and marks the end of a transaction. All memory writes that were speculatively executed since the matching begin_txn( ) are made permanent, and visible to other processors. This primitive also ends the effect of a matching begin_txn_check( ) primitive, returning true if a real transaction would have succeeded. Thus, the primitive end_txn_check( ) described in the preceding paragraph is not needed in all embodiments of the invention.

Finally, the primitive abort_txn( ) has a parameter mimic_hw of type integer. This primitive aborts the current transaction. If mimic_hw is true, then execution resumes with the matching begin_txn( ) returning false. Otherwise, execution continues after the abort_txn( ). It is not permissible to pass true to an abort_txn( ) that matches a begin_txn_check( ). In one embodiment, it may be useful to have the primitive begin_txn_check( ) return a true or false value so that abort_txn( ) can mimic a hardware abort, even for a pseudo-transaction.

The pseudo-code is line-numbered alphanumerically for descriptive convenience. The pseudo-code additionally is an example of a software-codified implementation of the method 100, as can be appreciated by those of ordinary skill within the art. Three initial definitions are first provided:

| A1 | typedef atomic_t txn_lock; |
|---|---|
| A2 | #define TXN_LOCK_HELD   0x80000000 |
| A3 | #define TXN_LOCK_DOLOCK 0x40000000 |
| A4 | #define TXN_LOCK_OWNER  0x3fffffff |

Line A1 defines the type txn_lock as an atomic operation. Lines A2, A3, and A4 define the constants TXN_LOCK_HELD, TXN_LOCK_DOLOCK, and TXN_LOCK_OWNER. The constant TXN_LOCK_HELD refers to the scenario where a software lock is currently being held, whereas the constant TXN_LOCK_DOLOCK refers to the scenario where a software locking approach, in lieu of a hardware transactional approach, is to be utilized. The constant TXN_LOCK_OWNER defines a bit field into which an identifier for the processor or thread holding the lock is placed.

The spin lock function 312 is then provided as:

| B1 | spin_lock(txn_lock *tp) |
|---|---|
| B2 | { |
| B3 | int oldval; |
| B4 | int newval; |

The spin_lock function receives in line B1 as an argument a pointer *tp to a variable of type txn_lock. The variables oldval and newval are declared in lines B3 and B4, and used internally by the spin_lock function to read values from atomic reads on the variable tp.

| B5 | for (;;) { |
|---|---|
| B6 | oldval = atomic_read(tp); |
| B7 | if (oldval & TXN_LOCK_DOLOCK) { |
| B8 | while ((oldval = atomic_read(tp)) & |
|  | ~TXN_LOCK_OWNER) |
| B9 | == TXN_LOCK_DOLOCK \| |
|  | TXN_LOCK_HELD) { |
| B10 | continue; |
| B11 | } |

The spin_lock function first atomically reads the variable tp as the variable oldval in the line B6. The "if" clause of lines B7-B11 is executed if the variable tp indicates that a software lock should be employed. The while loop of lines B8-B11 is executed to constantly loop while the variable tp, which is read as the variable oldval in line B8, continues to show that a software lock should be used, and that the software lock is in fact being held.

| B12 | if (oldval != TXN_LOCK_DOLOCK) { |
|---|---|
| B13 | continue; |
| B14 | } |

Next, if the variable oldval indicates that a software lock should not be utilized, in line B12, then in line B13 the result of the continue function causes the spin_lock function to reexecute, beginning at line B5.

| B15 | newval = oldval \| TXN_LOCK_HELD; |
|---|---|
| B16 | if (cmpxchg(&tp, oldval, newval) != oldval) { |
| B17 | continue; |
| B18 | } |

The variable newval is set equal to the variable oldval, and logically OR'ed with the constant TXN_LOCK_HELD, in line B15 to indicate that the software lock is held. The compare and exchange function is used in the "if" clause in line B16 to determine whether the variable oldval has now changed relative to the variable newval. If so, then this means that some other processor or thread modified the lock value, so that the attempted update fails, and the continue function in line B17 causes the spin_lock function to reexecute, beginning at line B5.

B19     begin_txn_check( );

The begin_txn_check( ) function is called in line B19 to flag the beginning of a pseudo-atomic section. The hardware will determine whether an atomic transaction equivalent to the lock's critical section would have succeeded, and report that via the commit_txn function in spin_unlock, as will be described.

| B20 | } else { |
|---|---|
| B21 | if (!begin_txn( )) { |
| B22 | oldval = atomic_read(tp); |
| B23 | if ((oldval & TXN_LOCK_DOLOCK) == 0) { |
| B24 | newval = oldval \| TXN_LOCK_DOLOCK; |
| B25 | (void)cmpxchg(tp, oldval, newval); |
| B26 | } |
| B27 | continue; |
| B28 | } |

The "if" clause in line B21 begins a hardware transaction, returning a non-zero result. If this transaction is later aborted, control will return to this begin_txn, which will then return a zero result. Thus, lines B22 through B27 are executed only when a hardware transaction is aborted. In this instance, if the variable oldval does not indicate that a software lock should be held, in line B23, then the variable newval is set equal to the variable oldval and logically OR'ed with the constant TXN_LOCK_DOLOCK, in line B24, to indicate that the software lock should now be used in preference to hardware transactions when executing the code section in question. The compare and exchange function is used in line B25 to attempt to set the variable tp to the variable newval, and the continue function in line B27 causes the spin_lock function to reexecute, beginning at line B5.

| B29 | oldval = atomic_read(tp); |
|---|---|
| B30 | if (oldval & TXN_LOCK_DOLOCK) { |
| B31 | abort_txn(FALSE); |
| B32 | continue; |
| B33 | } |
| B34 | } |
| B35 | } |
| B36 | } |

Finally, the variable oldval again is set equal to the variable tp, as atomically read in line B29. If the variable oldval indicates that a software lock should be held in line B30, then the hardware approach to transactional memory is aborted in line B31, and the spin_lock function reexecutes, beginning at line B5, due to the continue function in line B32.

The spin unlock function 314 is provided as:

| C1 | spin_unlock(txn_lock *tp) |
|---|---|
| C2 | { |
| C3 | int newval; |
| C4 | int nextval; |
| C5 | int oldval; |
| C6 | int result; |

The spin_unlock function receives in line C1 as an argument a pointer *tp to a variable of type txn_lock. The variables newval, nextval, and oldval, and declared in lines C3-C5, and are used internally by the spin_unlock function to hold values from atomic reads on the variable tp and to compute new values to be stored into variable tp via the cmpxchg function. The variable result is used to store the results from attempting to commit the transaction encompassing the code section in question by utilizing a hardware approach to transactional memory.

C7 result=commit_txn( );

The function commit_txn( ) is called in line C7, the results of which the variable result is set equal to, to commit execution of the section of code in question when using a hardware approach to transactional memory. If the software locking approach was instead used, the function commit_txn( ) instead indicates whether the hardware approach would have succeeded had it been used.

| C8 | if (((oldval = atomic_read(tp)) & (TXN_LOCK_HELD \| |
|---|---|
| C9 | TXN_LOCK_OWNER)) == (TXN_LOCK_HELD \| me( ))) { |
| C10 | if (result) { |
| C11 | newval = 0; |
| C12 | } else { |
| C13 | newval = TXN_LOCK_DOLOCK; |
| C14 | } |

In line C8, the variable oldval is set equal to the atomically read value of the variable tp. The "if" clause in lines C8 and C9 determines whether the variable oldval indicates that a software lock is being held by this processor or thread, where the me( ) function returns a unique identifier for the currently running processor, process, or thread. If the "if" clause yields true, then lines C10-C13 are performed. If the result of the commit_txn( ) operation in line C7 yielded a true result, indicating that the transaction could have been successfully committed to memory using the hardware approach, as tested in line C10, then the variable newval is set equal to zero in line C11. Setting the variable newval to zero will then be used to indicate that a software lock should not be later employed. Otherwise, if the variable result yielded a false result, as tested in line C10, then this indicates that the transaction was unsuccessfully committed to memory using the hardware approach, and in line C13 the variable newval is set to the constant TXN_LOCK_DOLOCK, to indicate that a software lock should be subsequently employed.

| C14 | while ((nextval = |
|---|---|
| C15 | cmpxchg(tp, oldval, newval)) != oldval) { |
| C16 | oldval=nextval; |
| C17 | } |
| C18 | } |
| C19 | } |

The variable nextval is set to the result of the compare and exchange function in lines C14 and 15. If the variable nextval is not equal to the variable oldval, then the variable oldval is set equal to the variable nextval in line C16, and the while loop of lines C14-C17 is repeated until the variable nextval is equal to the variable oldval. That is, the while loop of lines C14-C17 is employed to effectuate the variable newval as had been set in line C10 or line C12, within the variable tp.

The pseudo-code that has been described utilizes both actual hardware transactions, via the hardware transactional approach, as well as pseudo-transactions. The pseudo-transactions are employed to determine whether the hardware transactional approach would have been successful, so that the hardware transactional approach can be switched back to from the software locking approach. However, in another embodiment, once utilization of the hardware transactional approach has yielded to use of the software locking approach, the hardware transactional approach is never again utilized. That is, the software locking approach never switches back to the hardware transactional approach. In this embodiment, pseudo-transactions, and the corresponding pseudo-transaction primitives, are not needed and are not used.

Furthermore, in another embodiment, pseudo-transactions and their corresponding primitives may not be present, but the ability to switch back from use of the software locking approach to the hardware transactional approach may nevertheless be provided. For example, the pseudo-code may instead randomly select between real hardware transactions and software locking, weighted by historical transaction success and failure statistics. Such an approach, as well as other approaches, thus allow for the use of the hardware transactional approach even after the software locking approach has been employed, and where pseudo-transactional capability is not provided.

Alternative Embodiments

The pseudo-code listed and described in the previous section of the detailed description uses a simple threshold to determine whether the hardware approach to transactional memory should yield to the software approach to locking memory in executing the section of code in question. Specifically, in line B21, the hardware approach to transactional memory fails the threshold where it has aborted. That is, the hardware approach to transactional memory fails the threshold where it has aborted execution of the code section a single time.

Similarly, the pseudo-code uses the same simple threshold to determine whether the software approach to locking memory should yield back to the hardware approach to transaction memory in execution the code section in question. Specifically, in line C9, the hardware approach to transactional memory satisfies the threshold where it would not have aborted, when executing the section of code. That is, the hardware approach satisfies the threshold where it has, or would have, successfully committed the transaction encompassing the code section.

However, in alternative embodiments of the invention, more sophisticated thresholds are employed to determine whether the software approach to locking memory should be used in lieu of the hardware approach to transactional memory, and vice-versa, in executing a section of code. One such alternative embodiment has already been described, where the hardware approach has to fail to execute the code section, or abort the code section, a predetermined number of times greater than one before the software approach is employed. Likewise, the hardware approach would have had to successfully execute the code section the predetermined number of times before it is again actually used in lieu of the software approach.

In one embodiment, a digital filter is used to maintain state within the lock. A digital filter slows the response of a system where the inputs change too quickly. For instance, utilization of the software approach to locking memory may cause the state to increase by a fraction, and utilization of the hardware approach to locking memory may cause the state to decrease by the fraction, where the state can vary between zero and one. If the state is greater than a given threshold, such as one-half, then the software approach is utilized, whereas if it is less than the threshold, then the hardware approach is utilized.

In another embodiment, the compiler may pass information to the spin_lock( ) and spin_unlock( ) functions of the pseudo-code provided in the previous section of the detailed description. For instance, the compiler may determine a score based on the notion of transfer functions known to those of ordinary skill within the art. That is, the score realizes the expected number of memory references in the expected critical parts of the section of code in which the code section causes the transaction to abort, such as the number of references to distinct cache lines within the section of code. A transfer function is generated based on this number. Compilers that have full awareness of the hardware structures, such as cache size, associativity, and other transactional limitations, may be able to provide better estimates of the likelihood of hardware transactional success. The spin_unlock( ) function may be more aggressive in clearing the need for software locking where transactions are more likely to succeed. Information from the hardware of the system, such as the processor thereof, is thus passed to the spin_lock( ) and spin_unlock( ) functions through the compiler.

In another embodiment, the success rates of utilizing the hardware transactional approach are tracked. However, the act of tracking the success rate may cause transactions encompassing the code sections to be executed more likely to fail. Therefore, the spin_lock( ) function should record its identity so that the spin_unlock( ) function can communicate the measurements made. This may be accomplished within a machine register, bearing in mind that there may be many-to-many relationships between spin_lock( ) and spin_unlock( ) functional primitives.

In another embodiment, a per-lock caller state is maintained, which is comparable to branch-prediction tables in processors, as can be appreciated by those of ordinary skill within the art. The same lock may often be used for multiple critical parts of a code section that can cause transaction abortion and that have differing cache requirements. The spin_lock( ) function may record its address in the lock when acquiring the lock, and the spin_unlock( ) function may measure the transaction-completion success rate on a per-spin_lock( ) basis. The spin_lock( ) function can then more aggressively use transactions on sections of code where there have been good records of success.

In another embodiment, the number of times that a given section of code has transactionally failed is counted, such that the spin_lock( ) function is more likely to use software locking in cases where there have been multiple failures, even if the failures are not sequential. Furthermore, queued software locks or non-uniform memory-architecture (NUMA) software locks, as known to those of ordinary skill within the art, can be particularly used in differing embodiments of the invention. Reader-writer software locks, as known to those of ordinary skill within the art, may also be used in an alternative embodiment of the invention.

The pseudo-code described in the previous section of the detailed description is particularly useful where the software locks in question are perfectly nested. However, where the software locks are imperfectly nested, such as is the case with hierarchical locks, alternative approaches may be considered. First, the enclosing transaction may be aborted when a hierarchical lock is encountered. Alternatively, the hardware transaction application-programming interface (API) may be modified to accept the address of the lock, permitting the hardware to match the hierarchical transactions. In addition, a software check may be performed to determine if an enclosing transaction is currently being executed, such that the inner locks use the software approach in lieu of the hardware approach.

Advantages over the Prior Art

Embodiments of the invention allow for advantages over the prior art. Whereas utilizing a hardware approach to transactional memory to execute code sections can be advantageous from a performance perspective, embodiments of the invention nevertheless fall back on a slower software approach to execute the sections of code where the hardware approach fails, or aborts, too often. The embodiments of the invention thus ensure that the hardware approach is utilized where appropriate, such that the performance gains of utilization of the hardware approach are maintained. The embodiments also ensure that the software approach is utilized where the hardware approach is not appropriate, so that overall forward progress of sectional code execution continues and does not hang on an overly aborting hardware approach.

Conclusion

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. Accordingly, the scope of protection of this invention is limited only by the following claims and their equivalents.

What is claimed is:
1. A method comprising:
utilizing a software approach to locking memory to execute a code section relating to memory and employing a pseudo-transaction to determine whether a hardware approach to transactional memory to execute the code section would have been successful; and,
where the hardware approach to transactional memory to execute the code section satisfies a threshold based on success of at least the pseudo-transaction, subsequently utilizing the hardware approach to transactional memory to execute the code section.

2. The method of claim 1, wherein utilizing the software approach to locking memory to execute the code section comprises:
   placing a lock on the memory to which the code section relates;
   executing the code section;
   committing execution of the code section to the memory as the code section is executed; and,
   removing the lock on the memory to which the code section relates.

3. The method of claim 1, wherein the hardware approach to transactional memory satisfies the threshold also based on success of previous transactions employed by the hardware approach to transactional memory to execute the code section.

4. The method of claim 1, wherein the hardware approach to transactional memory satisfies the threshold also based on success of previous pseudo-transactions.

5. The method of claim 1, wherein the hardware approach to transactional memory satisfies the threshold where the hardware approach to transactional memory would have successfully executed the code section a single time.

6. The method of claim 1, wherein the hardware approach to transactional memory satisfies the threshold where the hardware approach to transactional memory would have successfully executed the code section a predetermined plurality of times.

7. The method of claim 1, wherein the hardware approach to transactional memory satisfying the threshold comprises utilizing a digital filter as the threshold in determining whether to utilize the hardware approach to transactional memory to execute the code section.

8. The method of claim 1, wherein the hardware approach to transactional memory satisfying the threshold comprises utilizing information passed from a compiler to determine whether to utilize the hardware approach to transactional memory to execute the code section.

9. The method of claim 1, wherein the hardware approach to transactional memory satisfying the threshold comprises tracking a success rate of the hardware approach to transactional memory in executing the code section to determine whether to utilize the hardware approach to transactional memory to execute the code section.

10. The method of claim 1, wherein utilizing the hardware approach to transactional memory to execute the code section comprises:
    starting a transaction inclusive of the code section;
    conditionally executing the transaction; and,
    upon successfully completing the transaction, committing execution of the transaction to the memory to which the code section relates.

11. A system comprising:
    a processor having transactional memory capability, including a pseudo-transactional memory capability that determines whether the transactional memory capability would have been successful; and,
    a memory storing a spin lock function to execute a code section by utilizing the transactional memory capability upon the transactional memory capability having satisfied a threshold based upon success of at least the pseudo-transactional memory capability.

12. The system of claim 11, further comprising a plurality of nodes interconnected to one another, one of the plurality of nodes inclusive of the processor and the memory.

13. The system of claim 11, wherein the memory further stores the code section, the code section programmed to call the spin lock function to execute, the spin lock function locking a portion of the memory to which the code section relates.

14. The system of claim 13, wherein the memory further stores a spin unlock function that the code section calls to unlock the portion of the memory to which the code section relates.

15. The system of claim 13, wherein the spin lock function initially utilizes the transactional memory capability in locking the portion of the memory to which the code section relates, falls back to a software approach to locking memory upon the transactional memory capability failing the threshold in executing the code section, and resumes utilizing the transactional memory capability upon the transactional memory capability again satisfying the threshold based upon success of at least the pseudo-transactional memory capability.

16. The system of claim 11, wherein the transactional memory capability satisfies the threshold also based upon previous success of the transactional memory capability in executing the code section.

17. An article of manufacture comprising:
    a tangible computer-readable storage medium; and,
    means in the medium for utilizing a hardware approach to transactional memory to execute a code section after having utilized a software approach to locking memory to execute the code section and the hardware approach to transactional memory having satisfied a threshold based at least upon a pseudo-transaction to determine whether the hardware approach would have succeeded in executing the code section.

18. The article of claim 17, wherein the means utilizes the hardware approach to transactional memory where the hardware approach to transactional memory would have successfully executed the code section a predetermined one or more times.

19. The article of claim 17, wherein the hardware approach satisfies the threshold also based on previous transactions utilized by the hardware approach to execute the code section and on previous pseudo-transactions.

* * * * *

UNITED STATES PATENT AND TRADEMARK OFFICE
CERTIFICATE OF CORRECTION

PATENT NO. : 7,587,615 B2  Page 1 of 1
APPLICATION NO. : 10/661017
DATED : September 8, 2009
INVENTOR(S) : Paul E. McKenney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1761 days.

Signed and Sealed this

Twenty-first Day of September, 2010

David J. Kappos
*Director of the United States Patent and Trademark Office*